Patented July 25, 1939

2,167,349

UNITED STATES PATENT OFFICE 2,167,349

PROCESS FOR BREAKING PETROLEUM EMULSIONS

Melvin De Groote, University City, and Bernhard Keiser and Charles M. Blair, Jr., Webster Groves, Mo., assignors, by mesne assignments, to Petrolite Corporation, Ltd., a corporation of Delaware No Drawing. Application May 9, 1938, Serial No. 206,904

7 Claims. (Cl. 196—4)

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, dispersed in a more or less permanent state throughout the oil which constitutes the continuous phase of the emulsion. They are obtained from producing wells and from the bottom of oil storage tanks, and are commonly referred to as "cut oil", "roily oil", "emulsified oil", and "bottom settlings".

The object of our invention is to provide a novel and inexpensive process for separating emulsions of the character referred to into their component parts of oil and water or brine.

Briefly described, our process consists in subjecting a petroleum emulsion of the water-in-oil type to the action of a treating agent or demulsifying agent of the kind hereinafter described, thereby causing the emulsion to break down and separate into its component parts of oil and water or brine, when the emulsion is permitted to remain in a quiescent state after treatment, or is subjected to other equivalent separatory procedures.

The treating agent or demulsifying agent contemplated for use in our present process consists of or comprises an amine of the kind hereinafter described. Said demulsifying agent may be in the form of the amine itself or in the form of the amine base derived by contact with water or in the form of a salt. The particular amine employed in the present process is characterized by the fact that it is of the kind which would be derived by reaction between a monobasic detergent-forming carboxy acid and a primary or secondary alkylolamine, provided that the reaction involved only the hydroxyl attached to the alkyl radical. In actual manufacture, in order to prevent salt formation and more particularly, amidification, amines of the kind contemplated for use in the present invention are preferably derived by other reactions. The composition and the method of manufacturing the same will be described subsequently in detail.

It has long been known that various acids combine with alkalis to produce soap or detergent-like materials. Such acids include the higher fatty acids derived from animal or vegetable sources, such as oleic acid, stearic acid, palmitic acid, ricinoleic acid, etc. Acids derived from rosins such as abietic acid, represent another class. Similarly, carboxy acids derived from petroleum, such as various naphthenic acids, represent another class. It is also well known that these various detergent-forming acids can be modified so as to produce equivalent derivatives, which have the same functional properties. For instance, chlorinated or brominated oleic acid produces detergent-like materials, and such acid is classified as detergent-forming acid. The same is true of chlorinated naphthenic acids, or hydrogenated abietic acids.

It is to be noted that the modifications of the various organic acids indicated do not involve such modifications of the kind which would change the material from a monobasic compound to a polybasic compound; for instance, reactions of such materials with sulfuric acid, phthalic acid, maleic acid, phosphoric acid, and the like, which result in the introduction of a radical containing an ionizable hydrogen atom, are not considered as functional equivalents of the unmodified fatty acids, resin acids, naphthenic acids, and the like.

In order to clearly point out the nature of the compounds employed in the present process, it may be well to indicate the general types of reactions involving amines and organic acids, such as fatty acids, abietic acid, naphthenic acids, the halogenated derivatives thereof, and the like. The typical reactions of such acids and amines, particularly primary or secondary amines, may be indicated by the following:

(A) Salt formation

R.COOH+R'NHH→[HHR'N.H] OOC.R (B) Amide formation

R.COOH+HR'NH→RCO.NR'H (C) The third type of reaction involves the fatty acid in the form of a salt so as to produce amino fatty acids.

(D) Still another type of reaction involves fatty acids and alkylolamines or their functional equivalents, such as hydroxy alicyclic amines. Such reaction in the case of a tertiary alkylolamine, for instance, triethanolamine, may be indicated in the following manner:

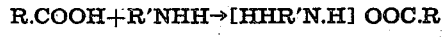
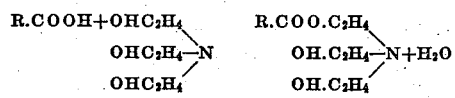

Attention is particularly directed to the previously described reaction because it involves esterification only. It is evident that the above reaction involving an organic acid, such as a fatty acid, for example, and triethanolamine, would also take place if monoethanolamine or diethanolamine were substituted for triethanolamine, provided that one could control or direct the reaction so that esterification took place instead of some other reaction, such as amidification.

Although it is not possible ordinarily to control such reactions involving a fatty acid and monoethanolamine or diethanolamine so as to obtain esterification reactions in the substantial absence of amidification, yet it is possible to rely upon other available reactions and obtain the same final product of reaction.

It is well known that if an alkyl halide or the equivalent is reacted with ammonia, one obtains an amine and hydrochloric acid. The hydrochloric acid, of course, may in turn react with the amine formed and thus produce the amine hydrochloride. Such amine hydrochloride can be reacted with dilute alkalis so as to liberate the amine. Not only can ammonia, of course, be reacted with an alkyl halide, but a primary amine may also be so reacted so as to yield a secondary amine. Such alkylation reactions are, of course, not limited to alkyl halides, but other materials may be so reacted. For instance, the selected alkylating agent may be employed in connection with an alkylamine such as amylamine, hexylamine, decylamine, etc. Similarly, an alicyclic amine such as cyclohexylamine, may be employed, or one may employ an aralkylamine such as benzylamine. The reactions of the kind just referred to are well-known reactions of organic chemistry and require no further elaboration.

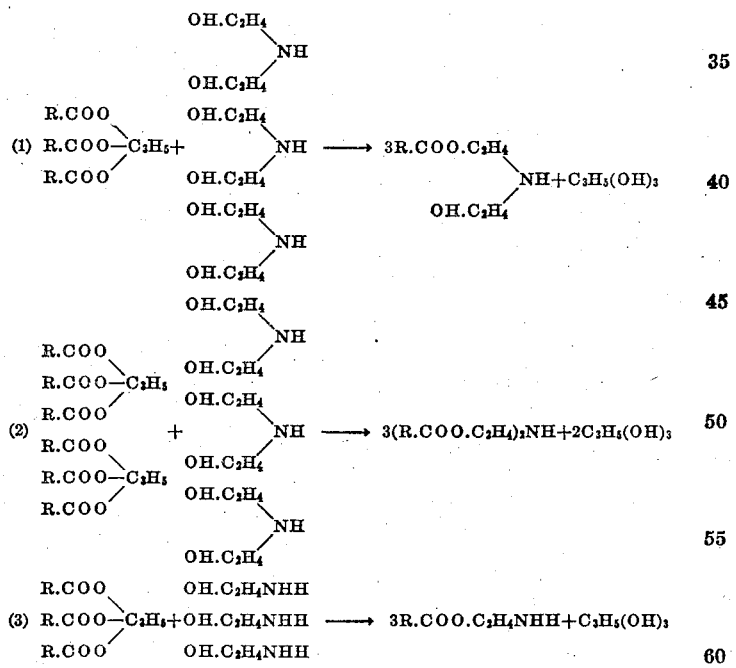

For sake of simplicity, they will be indicated below:

(I)   $R.COOH + OHC_2H_4OH \rightarrow R.COO.C_2H_4OH$
      $R.COO.C_2H_4OH + HCl \rightarrow R.COO.C_2H_4Cl$ (II)  $R.CO.Cl + OCH_2H_4OH \rightarrow R.COO.C_2H_4OH$
      $R.COO.C_2H_4OH + HCl \rightarrow R.COO.C_2H_4Cl$ (III) $R.COOH + OHC_2H_4Cl \rightarrow R.COO.C_2H_4Cl$
      $R.COOR' + OHC_2H_4Cl \rightarrow R.COO.C_2H_4Cl$
      $R.CO.Cl + OHC_2H_4Cl \rightarrow R.COO.C_2H_4Cl$ (IV)  $R.COO.C_2H_4Cl + NH_3 \rightarrow R.COO.C_2H_4NH_2$
      $2R.COO.C_2H_4Cl + NH_3 \rightarrow (R.COO.C_2H_4)_2NH$

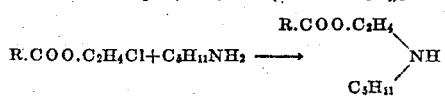

(V) By similar reactions one can obtain:

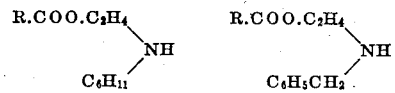

It is to be noted that the reactions are not limited to the kind obtained when ethylene chlorhydrin or, more exactly, ethylene glycol chlorhydrin, is employed, but one might also employ the chlorhydrin derived from a trihydric alcohol, glycerol, as well as the chlorhydrin derived from the dihydric glycol. Thus from the reactions above described, it is obvious that the following materials will also serve as functional equivalents:

(VI) 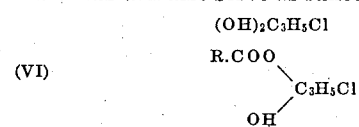

However, in many instances one can obtain a substantial yield of the desired amines by reaction involving esters of the detergent-forming acids, and more particularly, the glycerides of the fatty acids, for example.

Purely as a matter of simplicity, diethanolamine will be selected as the secondary hydroxyamine for reaction with a selected blown oil. Similarly ethanolamine will be employed to illustrate the primary amine. The reactions taking place in varying molecular proportions may be indicated in the following manner:

When esters derived from acids of relatively low molecular weight, such as acetic acid, oxalic acid, etc., are treated with ammonia or primary or secondary amines, the usual reaction is the formation of amides. The tendency towards amidization decreases with the increase in the length of the carbon chain or the molecular weight of the fatty acid. We have found that perhaps due to the nature of the detergent-forming acids themselves, or perhaps due to the larger molecular weight, or perhaps for both reasons or even for other reasons, that the treatment of detergent-forming acid esters with basic non-aryl primary or secondary amines, results in the formation to a large or predominant extent in materials of esterified form, indicated in the formula immediately preceding. In a general way, esterification reactions take place at a temperature below the point where amidification takes place. In conducting the reactions, one should select the lowest suitable temperature and conduct the reaction for an extended period of time, rather than employ a high temperature and short period of time. Such conditions make for a maximum of esterification and a minimum of amidification.

Instead of using glycerides of naturally-occurring fatty acids, one can prepare suitable esters from naphthenic acids or mixtures of naphthenic acids which are available in the open market. For instance, one can readily procure a naphthenic acid or mixtures of naphthenic acids having a molecular weight not less than 200 and not over 575, having a mean molecular weight of approximately 225, and having a distillation range varying from approximately 230° to 310° C. A typical distillation range is shown in the following table:

| | °C. |
|---|---|
| 10% | 230 |
| 20% | 255 |
| 30% | 268 |
| 40% | 273 |
| 50% | 278 |
| 60% | 279 |
| 70% | 287 |
| 80% | 292 |
| 85% | 292 |
| 100% | 310 |

These naphthenic acids should be soluble in 65% ethyl alcohol when 10% naphthenic acid is added, but they should be insoluble when only 5% is added. The selected naphthenic acids should show no substantial iodine number. When an iodine number determination is made by the Hubl-Waller method, they should not show an iodine number greater than 2 or 3. The saponification number should be in the neighborhood of 250. The specific gravity at 77° F. should be about 0.9635.

Naphthenic acids of the kind described are readily esterified with glycerol to give naphthenin. Such product depends on intimate mixture and agitation in presence of dried hydrochloric acid gas. The procedure is substantially the same as the formation of stearin from stearic acid in glycerol. Such naphthenin has a molecular weight of about 703. Abietin, which is available commercially as neutral gum, may of course be substituted for naturally-occurring fatty acid glycerides or for naphthenin prepared as previously described.

The manufacture of these compounds employing the esters such as the glycerides, is relatively simple. The selected glyceride and the selected hydroxy primary or secondary amine are mixed in suitable proportions and heated at some point above the boiling point of water, for instance, 110° C., and below the decomposition point of the amine or fatty material, for instance, 180° C., for a suitable period of time, such as 4–24 hours. Mild agitation is employed. A catalyst such as sodium oleate, sodium carbonate, caustic soda, etc., may be present in amounts of about ½% or less. It is to be noted that the fatty acids are present in ester form and not in the form of the free acid, and thus there is no tendency to form the salt to any marked extent, and if conducted at the lower range of reaction temperatures, there is a decided tendency to form the esterification products rather than the amidification products.

Four additional facts must be borne in mind in regard to these compounds. In the first place, these amines which are employed as demulsifying agents in the present process are not quaternary ammonium bases or salts thereof. The expression "quaternary ammonium" is properly and conventionally applied to compounds in which all four hydrogen atoms of the ammonium radical NH₄ have been replaced by a hydrocarbon radical or oxyhydrocarbon radical, as for example, in trimethyl phenyl ammonium hydroxide.

Secondly, an important characteristic which must be recognized is that these amine compounds are not amides. It has been previously pointed out that an amide formation involves a product in which there is a direct linkage between the carboxylic carbon atom and the nitrogen atom in the amine. This is not the case in the compounds employed as demulsifying agents in the present process.

In the third place, it must be recognized that these compounds are derived only from basic amines. The word "basic" is employed to exclude amines having little or no basicity such as the ordinary aromatic amines or any amine having at least one aryl radical directly joined to the amino nitrogen atom. For this reason, these amine products which are herein contemplated as demulsifying agents and which necessarily are characterized by freedom from any aryl groups as such, cannot be derived from aryl amines. They are derived solely from alkyl, alicyclic, or aralkyl amines having at least one hydroxyl group present. It is true that in the aralkyl amines there is an aryl group present, but it is not directly attached to the nitrogen atom as in the case of aryl amines but in fact represents nothing more or less than a substituted alkylamine. For instance, we consider benzylamine as being the primary amine, phenmethyl amine.

Finally, it must be recognized that these materials have lost no basicity in the forms of the esterified amine and that they exhibit all the properties of a basic amine, that is, they combine with water to form a base presumably a substituted ammonium compound, but not quaternary ammonium compound insofar that there are always two or three unsubstituted hydrogen atoms of the ammonium radical present. They combine with various acids to form salts. For example, they may be combined with acetic acid, hydrochloric acid, lactic acid, chloracetic acid, nitric acid, butyric acid, phosphoric acid, oxalic acid, or any suitable organic or inorganic acid, to form salts. It is understood that the reference in the specification and appended claims to the amines includes the basic form and the acid salts as well as the amines themselves. The characteristic demulsifying properties are contributed by the amine, and it is immaterial whether they may be considered as being in any one of the following forms:

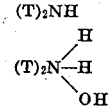 

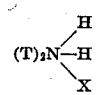 

in which T represents the substituents of the amino hydrogen radicals of the parent ammonia from which all amines are hypothetically derived and X simply represents the acid radical of any acid employed.

In referring to the amines derived by reactions involving the selected compounds and hydroxy primary or hydroxy secondary amines, it is to be noted that the products may be characterized by the following formulas:

in which $m$ is 1 or 2 and $m'$ is 0 or 1, with the proviso that $m+m'=2$; and $n$ denotes any small whole number, preferably less than 10, and in the case of diethanolamine, denotes the number 2. In the above formulas and in all subsequent formulas, including those appearing in the appended claims, R.COO represents the detergent-forming monobasic carboxy acid radical.

If instead of employing diethanolamine, ethyl ethanolamine, or a similar amine were employed, then the resulting products would be indicated by the following formula:

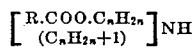

in which R.COO has the same significance as previously.

It is also possible to obtain compounds such as monoacetylated diethanolamine in which the acetyl radical has replaced one hydrogen atom of one of the hydroxy ethyl radicals. Acetic acid in this instance may be considered typical of the lower fatty acids which have less than 7 carbon atoms. If such monoacetylated diethanolamine were employed, the reaction product would be indicated by the following type formula:

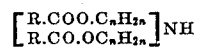

In this formula R.CO indicates an acyl radical derived from a low molecular weight fatty acid having less than 7 carbon atoms. Attention is directed to the fact that the divalent aliphatic radical indicated by $C_nH_{2n}$ may be a radical such as a $C_2H_4$ radical, $C_3H_6$ radical, $C_4H_8$ radical, $C_5H_{10}$ radical, or it may be an alicyclic radical or an aralkyl radical, as will become obvious from the kind of amines subsequently enumerated. Furthermore, where the radical $C_nH_{2n+1}$ which is a typical alkyl radical, appears, it may be a methyl radical, ethyl radical, propyl radical, butyl radical, amyl radical, hexyl radical, octyl radical, etc.

On the other hand, instead of being a monovalent alkyl radical, it may be a monovalent alicyclic radical such as a cyclohexyl radical, or it may be an aralkyl radical, such as a benzyl radical. In the claims appended hereto, it is understood that the expression "alkylol" includes the hydroxy hydrocarbon radicals whether derived from alkyl, alicyclic, or aralkyl radicals. It is furthermore understood in the hereto appended claims that the expression hydroxy alkyl includes hydroxy alicyclic as well as hydroxy aralkyl radicals, provided that in the latter the hydroxyl group is attached to the aliphatic side chain. Attention is also directed to the fact that the primary or secondary amines involving the dihydroxy propyl radical, $(C_3H_5OH)_2$, may substitute for the hydroxy alkyl radicals of the kind described. It is also understood that alkyl-oxy-alkyl radicals are the equivalent of an ordinary alkyl radical, insofar that they might appear in products such as the dihydroxy ethyl ether of diethanolamine, which may be indicated by the following formula:

Such material would be the obvious functional equivalent of diethanolamine in reactions of the kind contemplated in the manufacture of demulsifying agents employed in the present process. The amine employed as a demulsifying agent in the present process might be indicated by the following formula:

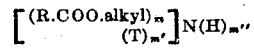

in which $m$ is 1 or 2, $m'$ is 0 or 1, and $m''$ is 1 or 2, with the proviso that $m+m'+m''$ is equal to 3; T is an alkyl radical or a radical of the type (R'COO.alkyl) or a hydroxy alkyl radical; and R'.COO represents an acid radical having less than 7 carbon atoms. The expression "alkyl" is used in the broad sense previously specified, and it is also repeated that the amine may be used in the form of the base or in the form of a salt.

Suitable bases which may be reacted with esterified monobasic carboxy detergent-forming acids or in other suitable manners to produce the reagents of the present process include: diethanolamine, monoethanolamine, ethyl ethanolamine, methyl ethanolamine, propanolamine, dipropanolamine, propyl propanolamine, monoglycerylamine, diglycerylamine, monoglycerylamylamine, etc. Other examples include cyclohexyl ethanolamine, cyclohexyl propanolamine, benzylethanolamine, pentanolamine, hexanolamine, octyethanolamine, octadecylethanolamine, cyclohexanolamine, dicyclohexanolamine, etc.

In indicating the various hydroxylated primary or secondary amines of the non-aryl type which may be employed to produce the amine contemplated as the demulsifying agent of the present process, it is desirable to indicate that amines of the type where a hydroxy acyl radical replaces a hydrogen atom of the hydroxy primary or secondary amine, are not included within the broad class of hydroxy tertiary amines unless there is another hydroxyl radical attached to the usual alkyl radical. For instance, if ethanolamine is treated with lactic acid so as to form the lactyl derivative of the following formula:

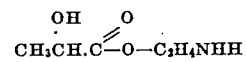

then it is understood that such materials would not represent a hydroxy primary amine within the meaning or scope as herein employed. The same would be true if the corresponding product derived from diethanolamine, provided that both hydroxy radicals had been esterified with lactic acid. If on the other hand, diethanolamine were treated with lactic acid so as to give monolactyl diethanolamine of the following composition:

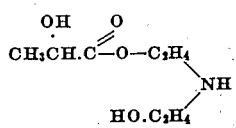

then such compound would be included due to the presence of the hydroxyl radicals attached to the alkyl radicals.

*Example I*

Castor oil (triricinolein) is employed. For convenience its molecular weight is considered as being 925. Commercial diethanolamine and castor oil in the proportion of one mole of castor oil to three moles of diethanolamine are heated at a temperature of 120-140° C. for about 12 hours. Mild agitation is employed. Loss of basicity is an indication of amidification. Time of reaction may be extended or temperature lowered or raised so as to insure maximum esterification. The reaction product so produced may be used as such or may be converted into the acetate by addition of the maximum amount of glacial acetic acid, which can be added without causing acidity to methyl orange indicator. Generally speaking, this will require about 2½ moles of glacial acetic acid or slightly less.

*Example II*

Ethanolamine is substituted for diethanolamine in Example I.

*Example III*

Ethyl ethanolamine is substituted for diethanolamine in Example I.

*Example IV*

Cyclohexylamine is reacted with glycerol monochlorhydrin to give monoglyceryl cyclohexylamine. This product is substituted for diethanolamine in Example I.

*Example V*

Glycerylamine is substituted for diethanolamine in Example I.

*Example VI*

Diglycerylamine is substituted for diethanolamine in Example I.

*Example VII*

Benzylamine is reacted with glyceryl monochlorhydrin to produce monoglyceryl benzylamine. This product is substituted for diethanolamine in Example I.

*Example VIII*

An ether amine of the following composition:

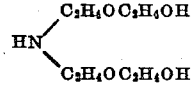

is substituted for diethanolamine in Example I.

*Example IX*

Naphthenin, prepared as previously described, is substituted for castor oil and employed in Examples I—VIII inclusive.

*Example X*

Abietin derived by complete esterification of abietic acid with glycerol is substituted for castor oil in Examples I-VIII inclusive.

We desire to emphasize that the products obtained in the above examples may be used in the form of the amine by direct contact with an emulsion without contact with water. They may be contacted with water, that is, used in the form of a solution so as to produce in a greater or lesser degree the amine base. Furthermore, any of the products above described may be combined with suitable acid. Acetic acid may be employed. Hydrochloric acid is particularly desirable. In some instances, acids such as oleic acid or naphthenic acid may be employed to give a suitable salt.

In examining the method of manufacture of these compounds as previously described, it is apparent that certain by-products appear such as glycerine, mono- or diglycerides, etc. From a practical standpoint it is unnecessary to separate these cogeneric materials, though it would be possible to do so by conventional processes. It is quite possible that these materials which appear as a part of the reaction mass contribute to a greater or lesser degree to the demulsifying power of the amine body. It may be that some of these materials which appear in the reaction mass cannot be completely identified as to their form. For instance, it is at once possible to see that condensation products might be formed under proper conditions between amines of the kind contemplated as demulsifying agents in the present process and either glycerol or ethanolamine, diethanolamine, or the like, by virtue of an ether linkage. In view of this fact, in the appended claims the demulsifying agent will not only be described in terms of the chemical structure of the amine, but also in terms of the method of manufacture. The purpose of the claims which are characterized by reference to the method of manufacture is specifically to include the general reaction mass produced in the manufacture of the amine bodies.

One should not lose sight of the fact, however, that the present invention is concerned particularly with the employment of certain chemical compounds of definitely stated composition which are present in significant or predominant amounts in the mixtures obtained by the reactions described. Needless to say, the employment of the selected demulsifying agents in the art of breaking crude oil emulsions is not limited to any particular method of manufacture except in the appended claims, in which specific reference is made to manufacturing procedure.

Attention is directed to the fact that the word "amidification" has been applied to the reaction involving the replacement of an amino hydrogen atom by an acyl radical without conventional limitation to a reaction involving ammonia. The replacement of the amino hydrogen atom of a primary amine or a secondary amine by an acyl radical has been considered as being amidification rather than the formation of a substituted amide or the formation of an imide or substituted imide. Such obvious departure from conventional nomenclature has been for purposes of simplicity and to show the similarity between certain reactions.

It is to be remembered that the reactions take place in any event under conditions which are substantially anhydrous. It is necessary to bear this fact in mind in order to appreciate that under such circumstances there is no salt formation. Naturally if such reactions were conducted in the presence of water, the primary or secondary hydroxy amines would act as a base and saponify the esters if employed, with the result that salts would be obtained. Salt formation is avoided in the manner which has been previously indicated.

Conventional demulsifying agents employed in the treatment of oil field emulsions are used as such, or after dilution with any suitable solvent, such as water, petroleum hydrocarbons, such as gasoline, kerosene, stove oil, a coal tar product, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents, such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well known classes of demulsifying agents.

One should not lose sight of the fact, however, that the present invention is concerned particularly with the employment of certain chemical compounds of definitely stated composition which are present in significant or predominant amounts in the mixtures obtained by the reactions described. Needless to say, the employment of the selected demulsifying agents in the art of breaking crude oil emulsions is not limited to any particular method of manufacture except in the appended claims, in which specific reference is made to manufacturing procedure.

It is well known that conventional demulsifying agents may be used in a water-soluble form, or in an oil-soluble form, or in a form exhibiting both oil and water solubility. Sometimes they may be used in a form which exhibits relatively limited water solubility and relatively limited oil solubility. However, since such reagents are sometimes used in a ratio of 1 to 10,000 or 1 to 20,000 or even 1 to 30,000, such an apparent solubility in oil and water is not significant, because said reagents undoubtedly have solubility within the concentration employed. This same fact is true in regard to the material or materials employed as the demulsifying agent of our process.

We desire to point out that superiority of the reagent or demulsifying agent contemplated in our process is based upon its ability to treat certain emulsions more advantageously and at a somewhat lower cost than is possible with other available demulsifiers, or conventional mixtures thereof. It is believed that the particular demulsifying agent or treating agent herein described will find comparatively limited application, so far as the majority of oil field emulsions are concerned; but we have found that such a demulsifying agent has commercial value, as it will economically break or resolve oil field emulsions in a number of cases which cannot be treated as easily or at so low a cost with the demulsifying agents heretofore available.

In practicing our process, a treating agent or demulsifying agent of the kind above described is brought into contact with or caused to act upon the emulsion to be treated, in any of the various ways or by any of the various apparatus now generally used to resolve or break petroleum emulsions with a chemical reagent, the above procedure being used either alone or in combination with other demulsifying procedure, such as the electrical dehydration process.

Having thus described our invention, what we claim as new and desire to secure by Letters Patent is:

1. A process for breaking petroleum emulsions of the water-in-oil type, characterized by subjecting the emulsion to the action of a demulsifying agent comprising a composition of matter derived by reaction, under substantially anhydrous conditions, between the ester of a monobasic carboxy detergent-forming acid and a non-aryl hydroxy amine having at least one amino hydrogen atom, within the molal ratio of 1:1 and 1:3, at a temperature above the boiling point of water and below the point of decomposition; and in such a manner as to produce substantial esterification; said reaction being conducted in a manner to yield a substantial quantity of basic material in which the monobasic carboxy detergent-forming radical is attached to the basic nitrogen atom through a carbon atom chain; with the added proviso that in said basic material the ratio of said acid radical to the amino nitrogen atom shall be at least 1:1 and not more than 2:1; and said basic material being further characterized by absence of amide and polyamino radicals.

2. A process for breaking petroleum emulsions of the water-in-oil type, characterized by subjecting the emulsion to the action of a demulsifying agent comprising a composition of matter derived by reaction, under substantially anhydrous conditions, between the ester of a monobasic carboxy detergent-forming acid and diethanolamine, within the molal ratio of 1:1 and 1:3, at a temperature above the boiling point of water and below the point of decomposition; and in such a manner as to produce substantial esterification; said reaction being conducted in a manner to yield a substantial quantity of basic material in which the monobasic carboxy detergent-forming radical is attached to the basic nitrogen atom through a carbon atom chain; with the added proviso that in said basic material the ratio of said acid radical to the amino nitrogen atom shall be at least 1:1 and not more than 2:1; and said basic material being further characterized by absence of amide and polyamino radicals.

3. A process for breaking petroleum emulsions of the water-in-oil type, characterized by subjecting the emulsion to the action of a demulsifying agent comprising a composition of matter derived by reaction, under substantially anhydrous conditions, between triricinolein and diethanolamine, within the molal ratio of 1:1 and 1:3, at a temperature above the boiling point of water and below the point of decomposition; and in such a manner as to produce substantial esterification; said reaction being conducted in a manner to yield a substantial quantity of basic material in which the fatty acid radical is attached to the basic nitrogen atom through a carbon atom chain; with the added proviso that in said basic material the ratio of said acid radical to the amino nitrogen atom shall be at least 1:1 and not more than 2:1; and said basic material being further characterized by absence of amide and polyamino radicals.

4. A process for breaking petroleum emulsions of the water-in-oil type, characterized by subjecting the emulsion to the action of a demulsifying agent comprising a chemical compound of the type indicated by the formula:

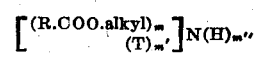

in which $m$ is 1 or 2, $m'$ is 0 or 1, and $m''$ is 1 or 2, with the proviso that $m+m'+m''=3$; R.COO is a monobasic carboxy detergent-forming acid radical; T is selected from the class consisting of an alkyl radical or a radical of the type

or a hydroxy alkyl radical; and R'.COO represents an acid radical having less than 7 carbon atoms.

5. A process for breaking petroleum emulsions of the water-in-oil type, characterized by subjecting the emulsion to the action of a demulsifying agent comprising a chemical compound of the type indicated by the formula:

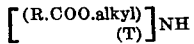

in which T is a hydroxy alkyl radical and R.COO is a monobasic carboxy detergent-forming acid radical.

6. A process for breaking petroleum emulsions of the water-in-oil type, characterized by subjecting the emulsion to the action of a demulsifying agent comprising a chemical compound of the type indicated by the formula:

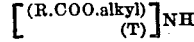

in which T is a hydroxy ethyl radical and R.COO is a monobasic carboxy detergent-forming acid radical.

7. A process for breaking petroleum emulsions of the water-in-oil type, characterized by subjecting the emulsion to the action of a demulsifying agent comprising a chemical compound of the type indicated by the formula:

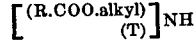

in which T is a hydroxy ethyl radical and R.COO is a fatty acid radical.

MELVIN DE GROOTE.
BERNHARD KEISER.
CHARLES M. BLAIR, Jr.

CERTIFICATE OF CORRECTION.

Patent No. 2,167,349.　　　　　　　　　　　　　　　July 25, 1939.

MELVIN DE GROOTE, ET AL.

It is hereby certified that error appears in the printed specification of the above numbered patent requiring correction as follows: Page 2, first column, line 66, third line of formula, for "OCH2H4OH" read OHC2H4OH; page 4, first column, line 29, for "previosuly" read previously; and that the said Letters Patent should be read with this correction therein that the same may conform to the record of the case in the Patent Office.

Signed and sealed this 3rd day of October, A. D. 1939.

(Seal)
Henry Van Arsdale,
Acting Commissioner of Patents.